United States Patent Office 3,081,301
Patented Mar. 12, 1963

3,081,301
PROCESS FOR THE PREPARATION OF 1,2,4-BEN-ZOTHIADIAZINE-1,1-DIOXIDE DERIVATIVES
George de Stevens, New Providence, and Lincoln Harvey Werner, Summit, N.J., assignors to Ciba Corporation, a corporation of Delaware
No Drawing. Filed Dec. 19, 1958, Ser. No. 781,460
3 Claims. (Cl. 260—243)

This invention concerns a process for the preparation of benzothiadiazine-1,1-dioxides. More particularly, it relates to a process for the manufacture of benz-sulfamyl-3,4-dihydro-2-H-[1,2,4]-benzothiadiazine-1,1-dioxides, in which the nitrogen atom of the sulfamyl group may be unsubstituted or substituted. In addition to the sulfamyl group the carbocyclic portion may contain the radicals $R_3$ and $R_4$, of which $R_3$ stands for hydrogen, lower hydrocarbon, substituted lower hydrocarbon, amino, nitro, etherified hydroxyl, sulfamyl, or particularly halogen, and $R_4$ primarily for hydrogen or one of the substituents mentioned for $R_3$, such as lower alkyl or halogen. The 3,4-dihydro-2-H-[1,2,4]-benzothiadiazine-1,1-dioxides prepared according to the procedure of this invention include particularly the benz-(N-$R_2'''$-N-$R_2''''$-sulfamyl)-2-$R_2'$-3-$R_1$-4-$R_2''$-3,4-dihydro-2-H-[1,2,4]-benzothiadiazine-1,1-dioxides, in which the carbocyclic portion contains the above-defined radicals $R_3$ and $R_4$, and in which $R_1$ represents hydrogen, a hydrocarbon, a substituted hydrocarbon, a heterocyclic and a heterocyclic-lower alkyl radical, and each of the radicals $R_2'$, $R_2''$, $R_2'''$ and $R_2''''$ stands for hydrogen, hydrocarbon or substituted hydrocarbon. These compounds may, therefore, be represented by the following formula:

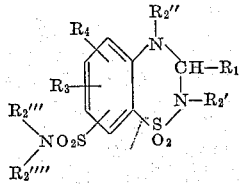

in which $R_1$ may represent hydrogen, or a hydrocarbon, a substituted hydrocarbon, a heterocyclic or a heterocyclic-lower hydrocarbon radical, each of the radicals $R_2'$, $R_2''$, $R_2'''$ and $R_2''''$ may be hydrogen, hydrocarbon or substituted hydrocarbon, $R_3$ may stand for hydrogen, lower hydrocarbon, substituted lower hydrocarbon, amino, nitro, etherified hydroxyl, sulfamyl, or particularly halogen, and $R_4$ primarily for hydrogen or one of the substituents representing $R_3$. The manufacture of acylated derivatives and salts of such compounds, whenever prepared according to the present procedure, are also included within the scope of this invention.

Apart from being hydrogen, $R_1$ may also stand for hydrocarbon radicals, for example, lower aliphatic hydrocarbon, such as lower alkyl, e.g. methyl, ethyl, propyl, isopropyl, butyl, isobutyl, secondary butyl, tertiary butyl, pentyl, isopentyl, neopentyl, etc.; lower alkenyl, e.g. vinyl or 1-propenyl; or lower alkinyl, e.g. ethinyl; carbocyclic aryl, such as monocyclic or bicyclic carbocyclic aryl, e.g. phenyl, 1-naphthyl or 2-naphthyl; or carbocyclic aryl-aliphatic hydrocarbon, such as carbocyclic aryl-alkyl, primarily monocyclic carbocyclic aryl-lower alkyl or bicyclic carbocyclic aryl-lower alkyl, e.g. benzyl, 2-phenyl-ethyl, naphthyl-1-methyl or naphthyl-2-methyl; or heterocyclic radicals, particularly monocyclic heterocyclic radicals, such as furyl, e.g. 2-furyl; thienyl, e.g. 2-thienyl or pyridyl, e.g. 2- or 4-pyridyl; or bicyclic heterocyclic radicals, such as quinolyl or piperonyl; or monocyclic heterocyclic-lower alkyl radicals, such as, for example, thenyl, e.g. 2-thenyl. These radicals may contain additional substituents; aromatic or heterocyclic portions may be substituted by lower alkyl, e.g. methyl; hydroxyl; lower alkoxy, e.g. methoxy; mercapto; lower alkyl mercapto, e.g. methyl-mercapto; sulfamyl; nitro; tertiary amino, e.g. dimethylamino; or halogen, e.g. chlorine or bromine; $R_1$ may, therefore, be represented, for example, by 4-chloro-phenyl, 3,4-dichloro-phenyl, 4-methoxy-phenyl, 3,4,5-trimethoxy-phenyl, 3-methyl-phenyl, 4-chloro-benzyl, 3,4-dichloro-benzyl, 4-methoxy-benzyl, 3,4,5-trimethoxy-benzyl, 3-methyl-benzyl, 2-methyl-pyridyl or similar substituents. Lower aliphatic hydrocarbon portions may contain hydroxyl; lower alkoxy, e.g. methoxy or ethoxy; tertiary amino, e.g. dimethylamino or diethylamino; or halogen, e.g. chlorine or bromine, as further substituents; $R_1$ may, therefore, be represented, for example, by chloromethyl, trichloromethyl, methoxy- or ethoxymethyl or similar substituents.

The radicals $R_2'$, $R_2''$, $R_2'''$ and $R_2''''$, apart from being primarily hydrogen, may represent lower aliphatic hydrocarbon radicals, such as lower alkyl, e.g. methyl, ethyl, propyl or isopropyl; monocyclic or bicyclic carbocyclic aryl, e.g. phenyl or 1- or 2-naphthyl; monocyclic or bicyclic carbocyclic aryl-lower alkyl, e.g. benzyl, 1-naphthyl-methyl or 2-naphthyl-methyl; or these radicals containing substituents such as those specifically mentioned for the radical $R_1$; substituted radicals are, for example, hydroxyethyl or similar radicals.

The radical $R_3$ stands primarily for halogen, e.g. fluorine, bromine, iodine, or particularly chlorine. In addition, it may also represent a hydrocarbon radical, such as lower aliphatic hydrocarbon, for example, lower alkyl, e.g. methyl or ethyl, or a substituted lower aliphatic hydrocarbon, such as, a halogeno-lower alkyl radical, e.g. trifluoromethyl. Other substituents may be, for example, a nitro group; an amino group, for example, a primary or a tertiary amino group, such as di-lower alkyl-amino, e.g. dimethylamino or diethylamino; an etherified hydroxyl group, for example, lower alkoxy, e.g. methoxy or ethoxy; or a sulfamyl group. $R_3$ may also represent hydrogen. $R_4$, being primarily hydrogen, may also stand for the substituents mentioned as being characteristic for the radical $R_3$.

Acylated derivatives are those containing acyl radicals of organic carboxylic acids, particularly of lower aliphatic carboxylic acids, such as, for example, carbonic acids, e.g. ethyl carbonic acid, or lower alkanoic acids, e.g. acetic or propionic acid. Other organic carboxylic acids are, for example, carbocyclic aryl carboxylic acids, particularly monocyclic carbocyclic aryl carboxylic acids, e.g. benzoic or substituted benzoic acids; or monocyclic carbocyclic aryl-lower alkanoic acids, e.g. phenyl-acetic acid. Mono- or poly-acylated products may be formed.

Salts of the compounds prepared according to the procedure of this invention are therapeutically useful salts with metals, particularly the alkali metal salts, such as those with sodium or potassium. Mono- or polysalts may be formed.

The 3,4-dihydro-2-H-[1,2,4]-benzothiadiazine-1,1-dioxides prepared according to the procedure of this invention show diuretic and natriuretic effects and may be used as diuretic and natriuretic agents to relieve excessive water and/or salt retention; for example, in connection with heart or kidney diseases. They may also have antihypertensive effects, which may be utilized to relieve states of hypertension. Generally, a valuable diuretic, natriuretic and antihypertensive effect can be obtained with 6-$R_3$-7-sulfamyl-3,4-dihydro-2-H-[1,2,4]-benzothiadiazine-1,1-dioxides, in which $R_3$ stands for halogen, e.g. fluorine, bromine, or particularly chlorine, lower alkyl, e.g. methyl, or halogeno-lower alkyl, e.g. trifluoromethyl, and in which the sulfamyl group may be otherwise unsubstituted or contain as further substituents lower alkyl radicals, e.g. methyl.

Particularly pronounced diuretic, natriuretic and antihypertensive activities are exhibited by the 3,4-dihydro-2-H-[1,2,4]-benzothiadiazine-1,1-dioxides of the formula:

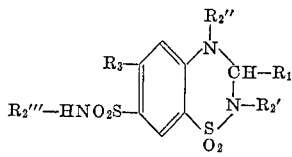

in which $R_1$ stands for hydrogen, lower alkyl, halogeno-lower alkyl, monocyclic carbocyclic aryl, or monocyclic carbocyclic aryl-lower alkyl, $R_2'$, $R_2''$ and $R_2'''$ represent hydrogen or lower alkyl, e.g. methyl, and $R_3$ stands for halogen, e.g. bromine, or particularly chlorine, lower alkyl, e.g. methyl, or halogeno-lower alkyl, e.g. trifluoromethyl. Representing this group of compounds are the 3,4-dihydro-2-H-[1,2,4]-benzothiadiazine-1,1-dioxides of the formulae:

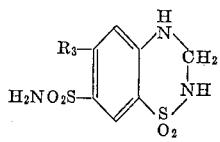

in which $R_3$ stands for halogen, particularly chlorine, and

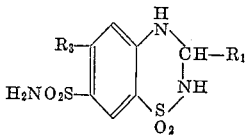

in which $R_1$ stands for lower alkyl, and $R_3$ represents halogen, particularly chlorine, and

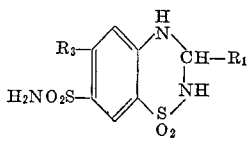

in which $R_1$ stands for halogeno-lower alkyl, and $R_3$ represents halogen, particularly chlorine, and

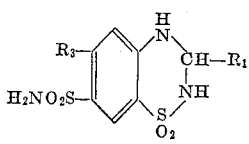

in which $R_1$ stands for monocyclic carbocyclic aryl-lower alkyl, and $R_3$ stands for halogen, especially for chlorine, and those derivatives of these compounds, in which one, two or all three of the nitrogen atoms are substituted by lower alkyl, particularly methyl. Acylated 1,2,4-benzothiadiazine-1,1-dioxide derivatives are particularly those acylated with acyl radicals of carbonic acids, e.g. ethyl carbonic acid, or lower alkanoic acids, e.g. acetic acid.

The process of the present invention comprises reducing in benz-sulfamyl-[1,2,4]-benzothiadiazine-1,1-dioxides, in which the sulfamyl group may be unsubstituted or substituted, the C=N-double bond of the 1,2,4-thiadiazine-1,1-dioxide portion, and, if desired, replacing in any resulting 3,4-dihydro-2-H-[1,2,4]-benzothiadiazine-1,1 - dioxide containing sulfamyl-nitrogens with hydrogen, such hydrogen by hydrocarbon, and/or, if desired, converting a resulting 3,4-dihydro-2-H-[1,2,4]-benzothiadiazine-1,1-dioxide into its acylated derivative, and/or, if desired, converting a resulting salt into a free compound, and/or, if desired, converting a free compound into a salt thereof. Thus, the preparation of benz-(N-$R_2'''$-N-$R_2''''$-sulfamyl)-2-$R_2'$-3-$R_1$-4-$R_2''$-3,4-dihydro-2-H-[1,2,4] - benzothiadiazine-1,1-dioxides, in which $R_1$, $R_2'$, $R_2''$, $R_2'''$ and $R_2''''$ have the above-given meaning and which may contain $R_3$ and $R_4$ of the above-given meaning as further substituents in the carbocyclic portion, the acylated derivatives and salts thereof, comprises treating 1,2,4-benzothiadiazine compounds of the formulae:

or in which $R_1$, $R_2'$, $R_2''$, $R_2'''$, $R_2''''$, $R_3$ and $R_4$ have the above-given meaning, or salts thereof with a reagent capable of reducing the C=N-double bond of the 1,2,4-thiadiazine-1,1-dioxide portion, and, if desired, carrying out the optional steps.

The conversion of the C=N-double bond may be achieved, for example, by treatment with a borohydride or an equivalent reducing agent capable of reducing such bond. The preferred reagents are alkali metal borohydrides, e.g. lithium borohydride, potassium borohydride or, particularly sodium borohydride. Other borohydrides are alkaline earth metal borohydrides such as calcium or strontium borohydride; aluminum borohydride may be used as well. Sodium dimethoxy borohydride is another possible reagent to be used in the reaction. If desired, these borohydrides may be used in the presence of an activating substance, such as, for example, aluminum chloride. The reaction is preferably carried out in the presence of an alkaline reagent, such as aqueous alkaline reagent, which may be diluted with other solvents such as those mentioned hereinbelow; such alkaline reagents are, for example, dilute aqueous solutions of alkali metal hydroxides, e.g. lithium, sodium or potassium hydroxide. If desired, organic solvents such as ethers, e.g. diethyleneglycol dimethylether; lower alkanols, e.g. methanol, ethanol, propanol, isopropanol or butanol; or liquid carboxylic acid amides, such as formamides, e.g. formamide or dimethylformamide, may be employed. The reduction is carried out at room temperature or at an elevated temperature, if necessary, in the atmosphere of an inert gas such as nitrogen.

A preferred embodiment of this process represents treatment of a 2-$R_2'$-3-$R_1$-4-$R_2''$-6-$R_3$-7-(N-$R_2'''$-sulfamyl)-[1,2,4]-benzothiadiazine-1,1-dioxide, in which $R_1$ stands for hydrogen, lower alkyl, halogeno-lower alkyl, monocyclic carbocyclic aryl or monocyclic carbocyclic aryl-lower alkyl, each of the radicals $R_2'$, $R_2''$ and $R_2'''$ represents hydrogen or lower alkyl, with the proviso that when one of the radicals $R_2'$ and $R_2''$ stands for lower alkyl, the other represents hydrogen, and $R_3$ stands for halogen, lower alkyl or halogeno-lower alkyl, with an alkali metal borohydride in an alkaline medium to produce the desired group of 3,4-dihydro-2-H-[1,2,4]-benzothiadiazine-1,1-dioxides. For example, the 6-chloro-7-sulfamyl-3,4-dihydro-2-H-[1,2,4]-benzothiadiazine-1,1-dioxide can be prepared by treating 6-chloro-7-sulfamyl-[1,2,4]-benzothiadiazine-1,1-dioxide with sodium borohydride in the presence of aqueous alkali metal hydroxide, e.g. sodium or potassium hydroxide.

The electrolytic reduction procedure provides another possibility of removing the C=N-double bond; such procedure is carried out according to standard methods. Generally it is performed on a cathode of high overpotential and at a current density greater than about 0.02 amp./cm.². Cathodes with high overpotential are, for example, those having an overpotential equal to or higher than cadmium, such as cadmium, zinc, mercury, lead amalgam or lead. Any appropriate anode, such as platinum, carbon, lead or stainless steel, and any appropriate anolyte, for example dilute sulfuric acid or dilute hydrochloric acid, may be employed. A lead or a platinum anode and a dilute sulfuric acid anolyte are preferred.

Any current density greater than about 0.02 amp./cm.$^2$ is sufficient to bring about the reduction of the C=N-double bond; however, for practical reasons a current density higher than about 0.25 amp./cm.$^2$ may depress the efficiency of the process due to increased hydrogen evolution.

The reduction is performed in an aqueous acidic medium, such as, for example, an aqueous solution of a strong inorganic acid, which ionizes readily and does not decompose at the current density employed, such as for example, sulfuric acid. In order to secure a complete solution of the starting material an additional solvent, such as, for example, a formamide, e.g. N,N-dimethyl-formamide is added. Lower alkanols, e.g. methanol or ethanol may replace or may be added with a formamide to enhance the solubility of the starting material and the end-product.

Diaphragms separating the anolyte and the catholyte are more especially ion exchange membranes, such as ion exchange resins (Amberplex), Alundum or parchment.

Any groups which may be affected by the hydrogenation procedure, may be protected or simultaneously converted into hydrogenated groups.

The starting materials used in the above reaction are known, or, if new may be obtained according to procedures used for the preparation of the known compounds.

In resulting 3,4-dihydro-2-H-[1,2,4]-benzothiadiazine-1,1-dioxides, containing sulfamyl-nitrogen atoms with hydrogen, such hydrogen atoms may be replaced by hydrocarbon. This may be achieved according to procedures known for substituting a sulfamyl-nitrogen atom. Thus, lower alkyl radicals, e.g. methyl or ethyl, may be introduced, for example, by reacting a solution of a resulting 3,4-dihydro-2-H-[1,2,4]-benzothiadiazine-1,1-dioxide in aqueous alkali metal hydroxide, e.g. lithium, sodium or potassium hydroxide, with a di-lower alkyl sulfate, e.g. dimethyl sulfate or diethyl sulfate. This reaction may be carried out, if desired, at an elevated temperature and/or at an increased pressure. Mono- or poly-substituted products may be formed depending on the conditions and/or the molar ratios.

A resulting 3,4-dihydro-2-H-[1,2,4]-benzothiadiazine-1,1-dioxide may be acylated according to procedures used for the preparation of nitrogen-acylated derivatives. Thus, by treating a 3,4-dihydro-2-H-[1,2,4]-benzothiadiazine-1,1-dioxide with a reactive functional derivative of a carboxylic acid, such as a halide, e.g. chloride, or an anhydride, mono- or poly-acylated products may be obtained. The reaction may be carried out according to known conditions, for example, in the absence or presence of a condensing reagent, such as a liquid organic base, for example, a tri-lower alkyl-amine, e.g. triethylamine, or a pyridine derivative, e.g. pyridine or collidine, particularly if an anhydride, e.g. acetic acid anhydride is used, or by using a metal salt, such as the silver salt or an alkali metal, e.g. sodium, salt of the 3,4-dihydro-2-H-[1,2,4]-benzothiadiazine-1,1-dioxide, for example, if an acid halide e.g. acetyl chloride, is used. Solvents are preferably anhydrous inert organic solvents, such as, for example, lower aliphatic ketones, e.g. acetone. Liquid basic condensation reagents, such as, for example, pyridine or collidine, may simultaneously serve as solvents. A liquid acylation reagent, such as, for example, acetic acid anhydride, may be used without an additional solvent. Depending on the conditions and/or the molar ratios, mono- or poly-acylated products may be obtained.

The resulting product may be obtained as the free compound or as a salt thereof. An alkali metal salt may be converted into the free compound by treatment with an aqueous acidic reagent, such as a mineral acid, for example, hydrohalic acid, e.g. hydrochloric acid, or sulfuric acid. A free compound may be converted into an alkali metal salt, for example, by treatment with an alkali metal hydroxide, e.g. sodium or potassium hydroxide, in a solvent, such as in a lower alkanol, e.g. methanol or ethanol, or in water and evaporating the solvent; or by reacting the free compound, for example, in an ether, e.g. p-dioxane or diethyleneglycol dimethylether, solution, with an alkali metal hydride or amine, e.g. sodium or potassium hydride or amine, and removing the solvent. Mono- or polysalts may be obtained.

Any resulting racemate may be converted into the antipodes thereof according to the methods used for resolving racemates.

This application is a continuation-in-part application of our application Serial No. 764,482, filed September 29, 1958, which in turn is a continuation-in-part of our application Serial No. 751,620, filed July 29, 1958 (now abandoned), which in turn is a continuation-in-part of our application Serial No. 740,582, filed June 9, 1958 (now abandoned), which in turn is a continuation-in-part of our application Serial No. 727,242, filed April 9, 1958 (now abandoned), which in turn is a continuation-in-part of our application Serial No. 718,452, filed March 3, 1958 (now abandoned).

The following examples illustrate the invention; they are not to be construed as being limitations thereon. Temperatures are given in degrees centigrade.

*Example 1*

0.75 g. of 6-chloro-7-sulfamyl-[1,2,4]-benzothiadiazine-1,1-dioxide is dissolved in 10 ml. of water by adding 35 drops of a 2 N aqueous solution of sodium hydroxide. 0.2 g. of sodium borohydride is added; the reaction mixture is allowed to stand at room temperature for five hours, and is then filtered and adjusted to pH=7–7.5. A crystalline precipitate is formed, which is filtered off, and the resulting 6-chloro-7-sulfamyl-3,4-dihydro-2-H-[1,2,4]-benzothiadiazine-1,1-dioxide is recrystallized from water, M.P. 268–272°.

The sodium or potassium salt of the resulting compound may be prepared by evaporating a solution of 6-chloro-7-sulfamyl-3,4-dihydro-2-H-[1,2,4] - benzothiadiazine-1,1-dioxide in aqueous sodium or potassium hydroxide, containing a stoichiometric amount of base.

The 6-chloro-2-methyl-7-sulfamyl-3,4 - dihydro - 2-H-[1,2,4]-benzothiadiazine-1,1-dioxide may be prepared as follows: 2.6 g. of 6-chloro-7-sulfamyl-3,4-dihydro-2-H-[1,2,4]-benzothiadiazine-1,1-dioxide is dissolved in 11 ml. of 1 N aqueous sodium hydroxide and 40 ml. of water. The solution is cooled to 10°, 1.4 g. of dimethylsulfate is added and the mixture is stirred at 10° for one hour and then at room temperatures for an additional hour. The solid material is filtered off to yield 2.8 g. of a wet material, which is recrystallized four times from a mixture of ethanol and water to yield the 6-chloro-2-methyl-7-sulfamyl-3,4-dihydro-2-H-[1,2,4] - benzothiadiazine-1,1-dioxide, M.P. 240–245°.

An acylated derivative may be prepared, for example, as follows: 3.0 g. of 6-chloro-7-sulfamyl-3,4-dihydro-2-H-[1,2,4]-benzothiadiazine-1,1-dioxide is refluxed in 15 ml. of acetic acid anhydride for one hour. The mixture is then cooled to room temperature, concentrated under reduced pressure, and the syrupy residue is diluted with water. The crystalline material is filtered off and is recrystallized from a mixture of ethanol and water to yield 2.7 g. of 6-chloro-2,4-diacetyl-7-(N-acetyl-sulfamyl)-3,4-dihydro-2-H-[1,2,4]-benzothiadiazine - 1,1 - dioxide, M.P. 225–227° (with decomposition).

*Example 2*

A solution of 7.4 g. of 6-chloro-7-(N-methyl-sulfamyl)-[1,2,4]-benzothiadiazine-1,1-dioxide in 300 ml. of diethyleneglycol dimethylether is treated with 1.4 g. of sodium borohydride and the reaction mixture is allowed to stand at room temperature for 4 hours; the solid material is then filtered off. The separated precipitate is dissolved in water at room temperature, the solution filtered through filter cell, and the filtrate is adjusted with 2 N aqueous hydrochloric acid to pH 7 whereupon a precipitate crystallizes.

The diethyleneglycol dimethylether filtrate is concentrated to dryness under reduced pressure and the remaining residue is worked in the above-described manner. The two crystallizates are combined and recrystallized from aqueous ethanol to yield the 6-chloro-7-(N-methyl-sulfamyl) - 3,4-dihydro-2-H-[1,2,4]-benzothiadiazine-1,1-dioxide, M.P. 260–265°.

The starting material may be prepared as follows: A solution of 18 g. of 6-chloro-7-sulfamyl-[1,2,4]-benzothiadiazine-1,1-dioxide in 66 ml. of 1 N aqueous sodium hydroxide and 240 ml. of water is warmed and the resulting solution is filtered and then cooled to about 10°. 8.4 g. of dimethyl sulfate is added dropwise while stirring; stirring is continued at 10° and then at room temperature for a total of 2 hours. The solid material is filtered off, washed with water and recrystallized several times from aqueous N,N-dimethylformamide to yield the 6 - chloro - 7 - (N-methyl-sulfamyl)-[1,2,4]-benzothiadiazine-1,1-dioxide, M.P. 337–339°.

From the recrystallization mother liquors the 6-chloro-7 - (N,N-dimethyl-sulfamyl)-[1,2,4]-benzothiadiazine-1,1-dioxide, M.P. 295–297°, can be isolated. The latter can also be obtained by using twice the amounts of dimethyl sulfate and sodium hydroxide.

*Example 3*

By treating 0.4 g. of 6-chloro-7-(N,N-dimethyl-sulfamyl)-[1,2,4]-benzothiadiazine-1,1-dioxide in 10 ml. of diethyleneglycol dimethylether with 0.1 g. of sodium borohydride according to the procedure described in Example 2, the 6-chloro-7-(N,N-dimethyl-sulfamyl)-3,4-dihydro-2-H-[1,2,4]-benzothiadiazine-1,1-dioxide, M.P. 238–240°, is obtained.

By substituting the 6-chloro-4-methyl-7-sulfamyl-[1,2,4]-benzothiadiazine-1,1-dioxide or the 6-trifluoromethyl - 7 - sulfamyl-[1,2,4]-benzothiadiazine-1,1-dioxide for the 6-chloro-7-(N,N-dimethyl-sulfamyl)-[1,2,4]-benzothiadiazine-1,1-dioxide in the above reaction the 6-chloro - 4-methyl-7-sulfamyl-3,4-dihydro-2-H-[1,2,4]-benzothiadiazine-1,1-dioxide and the 6-trifluoromethyl-7-sulfamyl - 3,4-dihydro-2-H-[1,2,4]-benzothiadiazine-1,1-dioxide, respectively, can be prepared.

*Example 4*

1 g. of 6-chloro-7-sulfamyl-[1,2,4]-benzothiadiazine-1,1-dioxide is dissolved in 20 ml. of N,N-dimethylformamide and 30 ml. of 2 N aqueous sulfuric acid is added. This solution is placed into the cathode chamber of an electrolytic cell having a mercury cathode of 20.5 cm.$^2$ surface. The cathode chamber is separated from the anode chamber by a porous clay membrane (Alundum membrane). The anolyte consists of a 2:3-mixture of N,N-dimethylformamide and 2 N aqueous sulfuric acid; a platinum electrode is used as the anode. Direct current is applied; at a temperature of from 15 to 20°, the initial current density is 0.163 amp./cm.$^2$, which after a reaction time of 24 minutes drops to 0.059 amp./cm.$^2$. The reference potential versus a standard calomel electrode is —1.3 v.

The catholyte is neutralized with 35 ml. of 2 N aqueous sodium hydroxide, concentrated to a small volume, filtered and the filtrate concentrated to dryness. The residue is triturated with water, the resulting 6-chloro-7-sulfamyl-3,4 - dihydro - 2-H-[1,2,4]-benzothiadiazine-1,1-dioxide is filtered off and recrystallized from water, M.P. 257–262°. A mixture of the resulting product and the compound prepared according to the method described in Example 1 does not show any melting point depression.

*Example 5*

When the 6-chloro-3-propyl-7-sulfamyl-[1,2,4]-benzothiadiazine-1,1-dioxide or the 6-methyl-7-sulfamyl-[1,2,4]-benzothiadiazine-1,1-dioxide is reduced according to either procedure described in Examples 1 and 4, the 6-chloro-3 - propyl-7-sulfamyl-3,4-dihydro-2-H-[1,2,4]-benzothiadiazine-1,1-dioxide and the 6-methyl-7-sulfamyl-3,4-dihydro - 2 - H-[1,2,4]-benzothiadiazine-1,1-dioxide respectively, can be obtained.

What is claimed is:

1. A process for the preparation of 2-$R_2'$-3-$R_1$-4-$R_2''$-6-$R_3$ - 7-(N-$R_2'''$-sulfamyl)-3,4-dihydro-2-H-[1,2,4]-benzothiadiazine-1,1-dioxide, in which $R_1$ represents a member of the group consisting of hydrogen, lower alkyl, halogeno-lower alkyl, monocyclic carbocyclic aryl and monocyclic carbocyclic-lower alkyl, each of the radicals $R_2'$, $R_2''$ and $R_2'''$ stands for a member of the group consisting of hydrogen and lower alkyl, and $R_3$ stands for a member of the group consisting of halogen, lower alkyl and halogeno-lower alkyl, which comprises treating a member of the group consisting of compounds of the formulae:

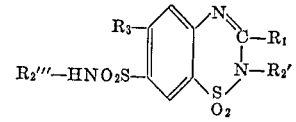

and

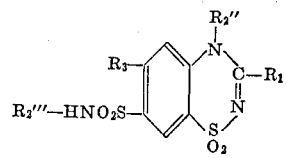

in which $R_1$, $R_2'$, $R_2''$, $R_2'''$ and $R_3$ have the above-given meaning, and an alkali metal salt thereof, with an alkali metal borohydride.

2. Process according to claim 1, which comprises using sodium borohydride as the alkali metal borohydride.

3. Process for the preparation of 6-chloro-7-sulfamyl-3,4 - dihydro - 2-H-[1,2,4]-benzothiadiazine-1,1-dioxide, which comprises treating 6-chloro-7-sulfamyl-[1,2,4]-benzothiadiazine-1,1-dioxide with sodium borohydride and aqueous alkali metal hydroxide.

References Cited in the file of this patent

UNITED STATES PATENTS

| | | |
|---|---|---|
| 680,543 | Pip | Aug. 13, 1901 |
| 1,947,732 | Parkes | Feb. 20, 1934 |
| 2,562,145 | Harman | July 24, 1951 |
| 2,578,787 | De Benneville | Dec. 18, 1951 |
| 2,683,721 | Schlesinger | July 13, 1954 |